(12) United States Patent
Gapontsev et al.

(10) Patent No.: US 9,088,131 B1
(45) Date of Patent: Jul. 21, 2015

(54) HIGH POWER SINGLE MODE FIBER PUMP LASER SYSTEMS AT 980 NM

(71) Applicant: IPG PHOTONICS CORPORATION, Oxford, MA (US)

(72) Inventors: Valentin Gapontsev, Worcester, MA (US); Igor Samartsev, Westborough, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/308,241

(22) Filed: Jun. 18, 2014

Related U.S. Application Data

(63) Continuation of application No. PCT/US2012/070463, filed on Dec. 19, 2012.

(60) Provisional application No. 61/577,339, filed on Dec. 19, 2011.

(51) Int. Cl.
*H01S 3/16* (2006.01)
*H01S 3/067* (2006.01)
*H01S 3/094* (2006.01)
*H01S 3/0941* (2006.01)

(52) U.S. Cl.
CPC ....... *H01S 3/094003* (2013.01); *H01S 3/06733* (2013.01); *H01S 3/06754* (2013.01); *H01S 3/0941* (2013.01); *H01S 3/1608* (2013.01); *H01S 3/1611* (2013.01); *H01S 3/1618* (2013.01)

(58) Field of Classification Search
CPC ............ H01S 3/0941; H01S 3/094003; H01S 3/06754; H01S 3/1608; H01S 3/1611; H01S 3/1618; H01S 3/06733
See application file for complete search history.

(56) References Cited

U.S. PATENT DOCUMENTS

| 7,038,844 B2* | 5/2006 | Dawson et al. ............ 359/341.1 |
| 2003/0202547 A1 | 10/2003 | Fermann |
| 2007/0230884 A1 | 10/2007 | Minelly |
| 2009/0046746 A1 | 2/2009 | Munroe |
| 2009/0092157 A1 | 4/2009 | Gapontsev |
| 2009/0190615 A1 | 7/2009 | Jiang |
| 2013/0195126 A1* | 8/2013 | Gapontsev et al. ............ 372/6 |

OTHER PUBLICATIONS

PCT/US11/048196, Valentin Gapontsev.
PCT/US10/051743, Valentin Gapontsev.

* cited by examiner

*Primary Examiner* — Eric Bolda
(74) *Attorney, Agent, or Firm* — Yuri Kateshov, Esq.; Timothy J. King, Esq.

(57) ABSTRACT

A high power pump ultra bright low-noise source is configured with a multimode ("MM") seed source outputting a MM smooth, low-noise signal light at a wavelength $\lambda p$ in a wavelength range between about 900 and 940 nm, a MM Yb fiber wavelength converter operative to convert emission of a plurality of high power ("HP") semiconductor laser diodes at a wavelength $\lambda sp$ to a pump output at the desired wavelength $\lambda p$. The Yb-doped MM wavelength converter is configured with noise levels substantially identical to and lower than those of the low-noise signal light, brightness ("B") substantially equal to $n \times B$, wherein n is a number HP semiconductor laser diodes, and B is brightness of each HP laser diode, and output power ("Po") substantially equal to nPd, wherein Pd is a power of each HP laser diode, and n is the number thereof.

30 Claims, 3 Drawing Sheets

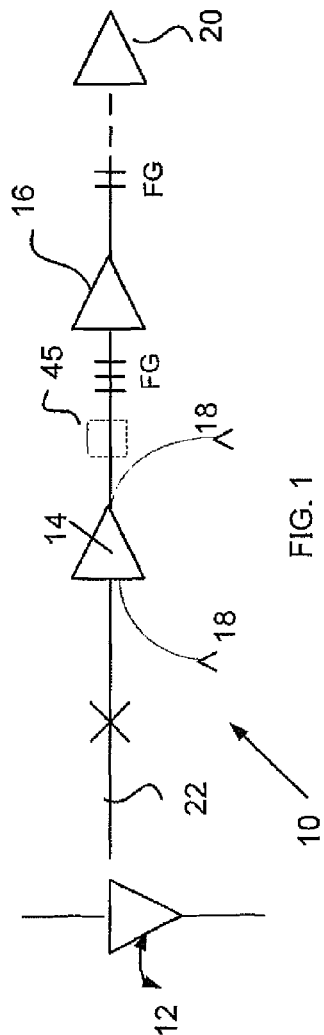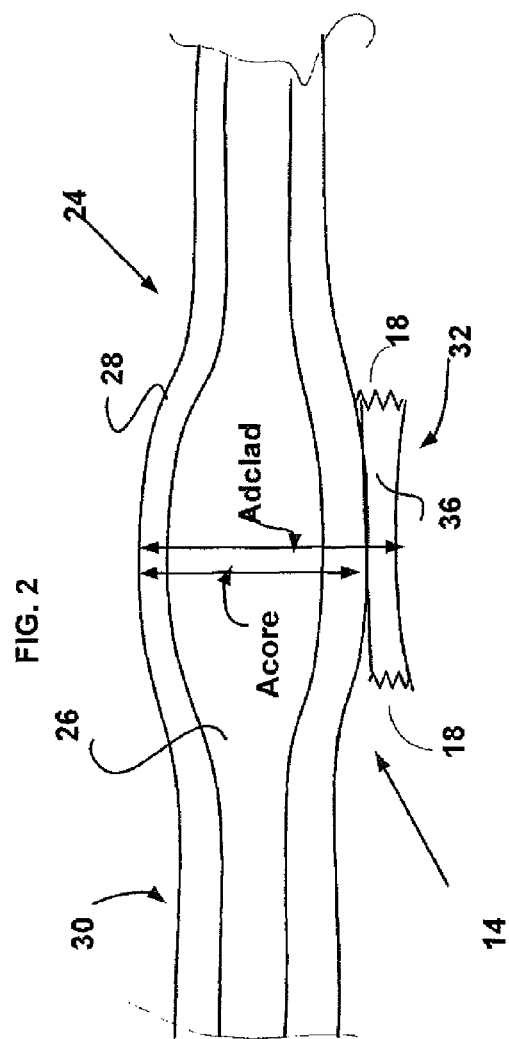

HIGH POWER SINGLE MODE FIBER PUMP LASER SYSTEMS AT 980 NM

BACKGROUND OF THE DISCLOSURE

1. Field of the Disclosure

The disclosure relates to single mode ("SM") high power fiber lasers and amplifiers operating at an absorption peak of about 975 nm. In particular, the disclosure relates to a fiber pump unit outputting a high power, ultra bright SM pump light in a 976 nm wavelength range (often referred to as 980 nm wavelength range).

2. Prior Art Discussion

Fiber laser systems including Ytterbium ("Yb"), Erbium ("Er") and other rare-earth ions doped fibers are highly efficient, cost-effective, compact and rugged light generating and light amplifying devices. Among these, Yb and Er fiber laser systems dominate the industrial fiber laser market mainly due to its excellent efficiency and long term stability.

Pump sources emitting light in a 976 nm range are of particular interest for a variety of industrial applications including, but not limited to pumping of high power Yb and Er fiber device with peak absorption at about 974-976 nm depending on a dopant composition of the fiber's core. The efficiency of fiber devices at the desired wavelength improves with higher pump light absorption and higher inversion population. For Yb fiber laser devices having more than one spectral gain region, the absorption is particularly important. With higher levels of absorption, the overall length of the doped fiber becomes shorter which, in turn, leads to higher thresholds for nonlinearities. The latter are the key to limiting deleterious non-linear effects affecting power scaling of fiber lasers and amplifiers. Therefore, pumping Yb doped fibers at wavelengths as close as possible to the peak absorption at about 975 nm provides for shorter fiber lengths and, therefore, higher thresholds for nonlinearities.

The existing pumps emitting light in the 976 nm range may be divided into two groups: SM light sources and MM light sources. SM light sources include typically laser diodes emitting high quality beams at low powers, whereas MM sources, also including laser diodes, can generate high powers but low brightness and, therefore, low quality beams. The inferior brightness of input light substantially worsens its absorption.

Accordingly, efficient Yb fiber laser devices operating in the desired absorption range thus require highly bright pump light in the 976 nm range. A highly efficient pump source capable of emitting high brightness light at about 976 nm is disclosed in PCT/2011/048186 co-owned with the current application and fully incorporated herein by reference. The disclosed pump source includes a pump seed signal light, a multimode ("MM") fiber converter emitting very bright pump light at wavelengths around 975 and a single mode ("SM") Yb fiber laser receiving the pump light and operative to emit high power, high brightness SM light at longer wavelengths in a 1015 nm range. The use of the above-discussed system may find certain applications even without SM YB laser in the desired 976 nm range, but in this case a radiation would be in multiple modes. The latter affects the brightness and quality of the output beam at about 976 nm.

A need therefore exists for pump sources with high power, ultra-high brightness SM outputs in about 976 nm range.

A further need exists for a high power fiber laser system, utilizing a pump source which emits an ultra-bright and high power SM pump light at about 976 nm.

SUMMARY OF THE DISCLOSURE

These needs are met by the disclosed pump source for fiber lasers and amplifiers doped with Yb and/or Er rare earth ions and having peak absorption in a 976 nm range. The disclosed pump source is configured to output a diffraction limited, ultra-bright beam at kW power levels and includes a sub-pump unit and a SM Yb fiber laser emitting high power, ultra-bright pump light at about 976 nm.

In accordance with one aspect of the disclosure, the sub-pump unit is configured to generate high brightness sub-pump light coupled into the SM Yb fiber laser. The unit has a plurality of MM laser diodes which output sub-pump light at a relatively short wavelength, and a MM Nd doped fiber wavelength converter of the sub-pump light wavelength to an amplified and converted sub-pump output at a longer wavelength. The use of multiple MM sub-pump laser diodes contributes to high power levels at the output of the converter. The latter, being a fiber amplifier, not only amplifies a pump signal light from a pump seed source, but because of high power sub-pump light, it also substantially increases the brightness of the pump signal light.

In accordance with a further aspect of the disclosure, the SM Yb laser of the pump source is configured to efficiently absorb the sub-pump light due to the geometry of the Yb-doped active fiber which provides for a high ratio between core and clad diameters allowing high-brightness sub-pump light to be efficiently absorbed. As a result, the output of the SM Yb fiber laser, which is a pump output in the desired 976 nm range, is even brighter than that one of the sub-pump light.

BRIEF DESCRIPTION OF THE DRAWINGS

The above and other aspects, features and advantages of the disclosed device will become more readily apparent from the following specific description accompanied by the drawings, in which:

FIG. 1 illustrates a high power fiber laser system with the disclosed pump source outputting a high power, ultra-bright SM at wavelengths in 976 nm range.

FIG. 2 illustrates one of possible configurations of a MM Nd wavelength converter of the pump source of FIG. 1.

SPECIFIC DESCRIPTION

Figure 4:
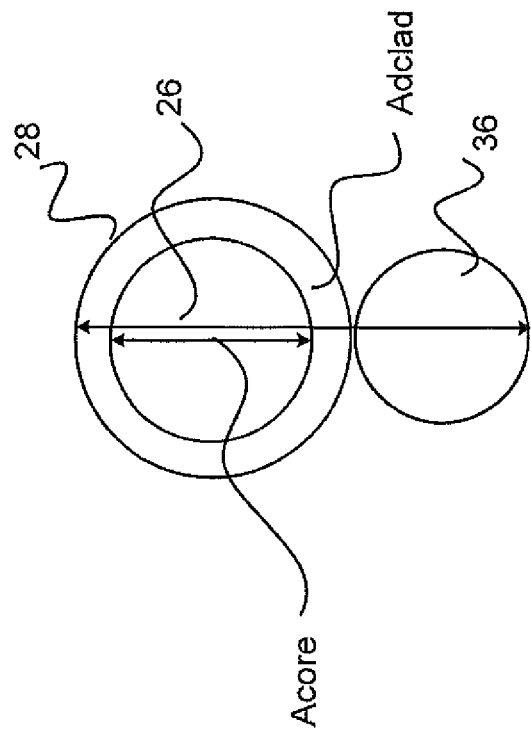
FIGS. 3 and 4 illustrate respective cross-sections of initial and final configurations, respectively, of the Nd wavelength converter taken along lines I-I in FIG. 2.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale.

Referring to FIG. 1, a pump source 10 is configured, among others, with a pump seed source or a plurality of seed sources 12 emitting a seed signal in a 900-940 nm range, with a wavelength about 915-920 nm being preferable. The seed signal is further coupled into a sub-pump unit including a MM wavelength converter 14 which is a fiber amplifier configured with a Nd-doped MM fiber and operative to convert emission of sub-pump laser diodes 18 at 800-810 nm to a sub-pump emission at about 915-920 nm. A SM Yb fiber laser 16 provided with a resonant cavity, which is defined between fiber gratings FGs, and receiving the converted and amplified sub-pump emission, completes the configuration of pump source 10. As disclosed hereinbelow, pump source 10 is operative to emit an ultra-bright, high power SM pump light at the wavelength in the 976 nm range which is further coupled into a fiber laser or amplifier 20 having peak absorption at about 976 nm and doped with Yb, Er or Yb/Er ions.

The pump seed source 12 is configured with one or combined together MM pigtailed laser diodes emitting a sub-pump signal light at the desired wavelength, for example, at about 920 nm. As one of ordinary skill in the laser arts knows, laser diodes output a relatively spike-less, i.e., smooth and low-noise signal. Typically, a noise level, measured in root-mean-square (r.m.s.) units, is about 0.1 r.m.s, whereas a numerical aperture ("NA") of the sub-pump signal light typically ranges between about 0.1 and 0.13. The output power of the signal light may vary between tens and hundreds of watts. While a semiconductor structure of seed 12 is preferable due to a relatively smooth output, alternatively, it may also have a fiber configuration. The signal light is further coupled into a passive MM fiber 22 guiding it further along a light path to MM Nd wavelength converter 14 where the signal is amplified and its brightness is increased at least in ten times.

The use of fibers, such as a MM Nd-doped fiber of wavelength converter 14, dramatically increases the light brightness as explained hereinbelow. The brightness B may be determined as $$B \sim P/BPP, \quad (1)$$

where P is output power, and BPP is beam product parameter determined as a product of beam divergence half angle and beam radius. The lower the BPP, the higher the beam quality, the greater the brightness. Accordingly, a diffraction-limited Gaussian beam has lowest BPP. The BPP corresponds to ½Dc×NA, wherein Dc-core diameter and NA-numerical aperture. Accordingly, increasing the core diameter Dc and decreasing the NA enhances the BPP and increases brightness B. Thus, controlling fiber manufacturing, a fiber may have a low NA and low dopant concentration, which is advantageous for the reasons discussed hereinbelow.

The Nd, is characterized by amplification at respective signal and parasitic wavelengths corresponding to respective 900 nm and 1060 nm ranges. Furthermore, the gain at parasitic wavelengths in a 1060 nm range and the desired value of the gain at signal wavelength in a 900 nm range is proportional to a product of the overall length of the Nd-doped fiber and concentration of active ions. Typically, with the increase of fiber length and ion concentration, the gain in the parasitic range increases which detrimentally affects the gain in the working wavelength range. Thus, using greater fiber lengths and/or higher Nd-ion concentration inevitably leads to the amplification in about 1060 nm range being greater than that one in the desired 900 nm range. To minimize undesirable amplification at parasitic wavelengths, absorption of sub-pump light should be increased without increasing Nd fiber length and low ion concentration.

In accordance with one aspect of the disclosure, the increased absorption of sub-pump light at about 800-810 nm is a result of high ratio between diameters of Nd-fiber's core and cladding, respectively. With the increased ratio, i.e., enlarged core diameter but the same or decreased cladding diameter, the absorption of sub-pump light increases.

FIG. 2 illustrates one embodiment of Nd-doped fiber 24 of converter 14 configured to realize this aspect of the disclosure. In particular, Nd doped fiber 24 side-pumped by sub-pump diodes 18 has a double-bottleneck shape, as disclosed in PCT/U.S. Ser. No. 10/051,743 commonly owned with the present application and fully incorporated herein by reference.

As shown, wavelength converter or fiber amplifier 14 is provided with MM, multi-clad Nd fiber 24 flanked by input and output single mode (SM) (or MM) passive fibers which are butt-spliced to respective opposite ends of active fiber 24. The sub-pump diodes 18 are optically and mechanically coupled together to define a combiner which, as known to one of ordinary skill in the art, guides the combined MM output to Nd fiber 24 through a coreless MM delivery passive fiber 36 side-pumping converter 14. The coupled stretches of respective delivery and active fibers define a coupling region along which the pump light is launched into and absorbed by a Nd gain medium provided in a core 26 of fiber 24. If necessary, the connected fibers may be pulled away from one another in response to external forces applied thereto. The Nd ions are introduced into fiber's core 26 at a concentration varying within a range between about 10 and 200 ppm, with a 50-100 ppm range being preferable for the desired gain in a 900 nm wavelength range and reasonable gain suppression in a 1060 nm range.

The geometry of Nd active fiber 24, i.e. the cross-sections of respective core 26 and cladding 28 along a longitudinal fiber axis, has a double bottleneck-shaped cross-section. The latter includes a narrowly-dimensioned input end region 30, uniformly dimensioned amplification mid region 32, which has an area Acore larger than that one of the input region, and a frustoconical input transformer region 24 bridging the end and mid core regions. To complete the double bottleneck section, core 26 further has output frustoconical transformer and end regions configured either substantially identically or differently if needed to the respective input regions. The core 26 may support a single transverse mode or multiple modes. The cladding 28 may have a cross-section complementary to that one of core 26 or may have a uniform cross-section.

Figure 3:
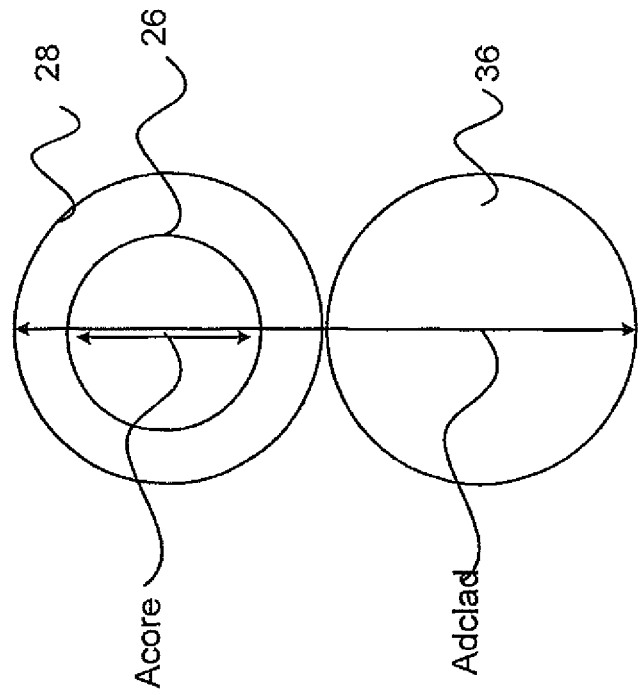

As shown in FIG. 3, initially, delivery and Nd fibers 36 and 24, respectively may have comparable outer diameters, whereas cross-section Acore of core 26 is visibly smaller than that one of clad area Aclad which is the sum of clad areas of Nd and delivery fibers, respectively. To increase the ratio, diametrically opposite tension forces are so applied to respective fibers 24 and 36 that the cross-section of the combined clad area deceases and, simultaneously, the core area increases, as shown in FIG. 4. The increasing and decreasing coefficients of the respective fibers are not arbitrary. The coefficients are so selected that an NA of converter 14 can be at most equal to, but preferably smaller than that one of seed source 12 f of FIG. 1 of up to 0.08.

As a result, the amplified pump signal light emitted by converter 14 at the desired 915-920 nm wavelength is very bright due to a relatively small ratio between core and clad diameters of Nd fiber 24 and a high sub-pump power absorbed in Nd fiber 24 which is configured with a high dcore/Dclad ratio. The brightness of the converted pump signal light proportional to n×B, wherein n is a number MM sub-pump laser diodes, and B is brightness of each HP laser diode 18. The enhanced pump signal light is also highly powerful due to a plurality of MM sub-pump diodes 18. The power of the amplified pump signal light Pco is also proportional to n×Pld, where n is number of HP laser diodes 18 and Pld-power of each individual diode, and can rich a kW level. Of course, the output power also depends on the power of the pump signal light emitted by seed source 12 which should be factored in determining the overall power of the sub-pump unit. Note that while laser diodes 18 are shown to side-pump wavelength converter 14, diodes 18 can be arranged in an end pumping configuration in a manner readily realized by one of ordinary skill in the laser arts, provided of course that the core/clad ratio of Nd fiber 24 remains optimally high.

Returning briefly to FIG. 1, as one of ordinary skill in the laser arts well knows, the peak emission at about 1030 nm is impossible to completely eliminate. To prevent sub-pump converted light at about 1030 nm from coupling into SM Yb fiber laser 16, pump source 10 further includes a filter 45 between converter 14 and SM laser 16. There are many different types of optical filters, based on different physical principles. For example, filter 45 may be selected from a passive fiber provided with long-period or slanted fiber grating. Alternatively, a passive fiber with increased concentration of samarium ($Sm^{3+}$) or other similarly functioning dopants known to one of ordinary skilled in the art may be used as a filter. Still another possibility is to have the filter configured with a passive fiber having the W refractive index profile.

Figure 5:
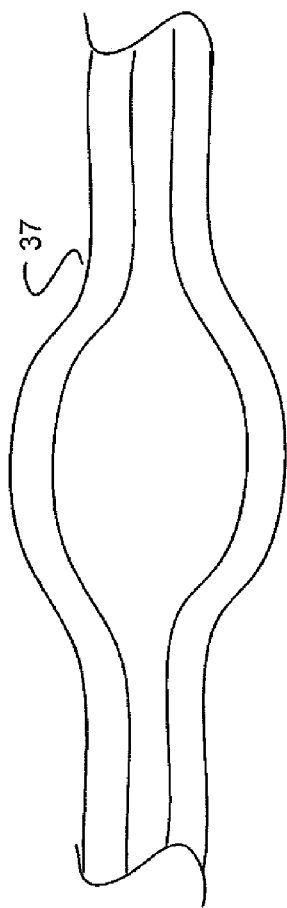
FIG. 5 illustrates one of possible embodiments of a SM Yb-fiber laser of the pump source shown in FIG. 1.

Referring to FIG. 5, the converted sub-pump light is further coupled into SM Yb fiber laser 16. As discussed above, with the increased brightness of the amplified seed signal light and high inversion population, the SM pump light emitted in the desired 976 nm range may be brighter than the signal pump light in hundred times. At the same time, light emission at parasitic 1015 nm is substantially suppressed.

The brightness of the pump light may be even further improved by configuring SM Yb oscillator 16 analogously to the configuration of Nd converter 14 shown in FIG. 2. Thus, Yb-doped fiber 37 may also have a double bottleneck longitudinal cross-section with all the advantages discussed above.

Figure 6:
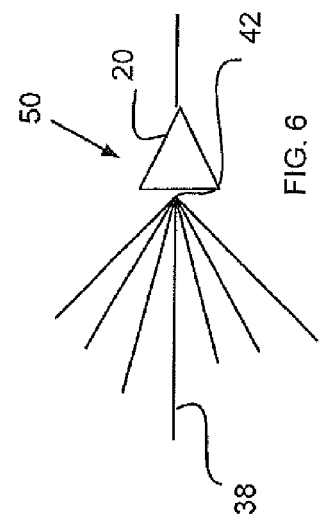

FIG. 6 illustrates one of possible applications of pump source 10 of FIG. 1 in an ultra-high power fiber laser system 50 provided with an Yb or Er-doped laser or amplifier 40. In particular, high power fiber laser system 50 includes a plurality of pump sources 10 combined together in a bundle. A central SM signal fiber 38, guiding a signal in a 980 nm wavelength range extends through the bundle and is optically connected to pumps 10 surrounding signal fiber 38. The output fiber 42 of the combined pump sources and central signal fiber delivers the pump and signal lights into fiber amplifier or laser 20 in accordance with an end pumping technique. The fiber amplifier or laser 20 is configured to output a high power, diffraction limited beam in the desired wavelength range. If the fiber device 20 is based on Yb-doped fibers, its peak emission wavelength preferably does not exceed the pump wavelength at more than about 0.1. The active fibers of fiber laser device 20 may be a SM devices with either SM core or multimode core capable of supporting substantially a fundamental mode at the desired wavelength. If desirable, a polarization maintaining fiber can be used in the illustrated system.

Figure 7:
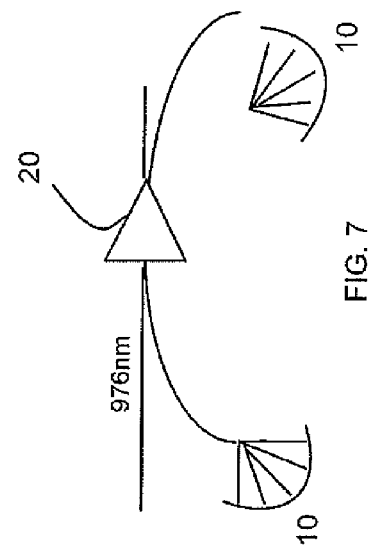
FIGS. 6 and 7 illustrate respective configurations of a high power fiber laser system utilizing the pump source of FIGS. 1-5.

FIG. 7 illustrates another configuration of the disclosed pump sources 10 in high power fiber laser system 50. Here, a plurality of pump groups, each including multiple high power, ultra bright fiber laser pump sources 10 of FIG. 1, and YB or Er fiber device 20 define a side pumping arrangement. The pump sources 10 of each group are combined together so as to have a single output fiber guiding pump light from the combiner at the desired wavelength to, for example, Yb fiber amplifier 20. The latter may be configured with a SM core or a MM core, the MM core and is configured to emit the system light in substantially the single mode at a desired wavelength may output an ultra high light in a substantially single fundamental or low mode output.

Both configurations shown in respective FIGS. 6 and 7 feature an upgraded high power fiber laser and/or amplifier which is pumped with a high power, ultra bright pump signal whose emission wavelength substantially coincides with an absorption peak at about 975 nm of Yb or Er gain medium of fiber device 20. Because of the latter, as one of ordinary skill in the laser arts readily realizes, in the schematics shown in respective FIGS. 6 and 7, the length of the active fiber of upgraded amplifier 20 is substantially reduced, whereas a threshold for nonlinear effects is raised.

Having described at least one of the preferred embodiments of the present invention with reference to the accompanying drawings, it is to be understood that the invention is not limited to those precise embodiments. For example, the disclosed pump sources can be integral parts of CW and pulsed laser systems. Various changes, modifications, and adaptations including different wavelengths, fiber parameters and rare-earth dopants may be effected therein by one skilled in the art without departing from the scope or spirit of the invention as disclosed above.

The invention claimed is:

1. A high power ultra-bright pump source ("HPUBPS"), comprising:
   at least one seed source generating a low-noise signal light at a first wavelength;
   a sub-pump unit configured to receive and amplify the signal light and having:
      a plurality of sub-pump multimode ("MM") laser diodes combined together to emit a sub-pump light at a second wavelength shorter than the first wavelength, and
      a Nd MM wavelength fiber converter operative to convert the second wavelength of the sub-pump light to the first wavelength of the signal light, the Nd MM fiber converter being configured to emit the amplified signal light having:
         a noise level substantially identical to that one of the low-noise signal light,
         a brightness substantially equal to nB, wherein n is a number of the sub-pump laser diodes, and B is brightness of each sub-pump laser diode, and
         an output power substantially equal to nPd, wherein Pd is a power of each MM sub-pump laser diode, and n is the number thereof; and
   a single mode ("SM") Yb fiber oscillator receiving the amplified signal light and having peak emission at a third wavelengths around 976 nm.

2. The HPUBPS of claim 1, wherein the first wavelengths of the light signal varies within a 900-940 wavelength range, and the second wavelength of the sub-pump light is within a 800-810 wavelength range.

3. The HPUBPS of claim 1, wherein the sub-pump laser diodes end-pump the Nd MM wavelength fiber converter.

4. The HPUBPS of claim 1, wherein the sub-pump laser diodes side-pump the Nd MM wavelength fiber converter.

5. The HPUBPS of claim 1, wherein the wavelength converter is configured so that the amplified low noise pump output has a root-mean-square (r.m.s.) value at most 0.1% r.m.s.

6. The HPUBPS of claim 1, wherein the seed source has a configuration selected from a group consisting of one or more combined MM pigtailed laser diodes and one or more fiber seed sources.

7. The HPUBPS of claim 1, wherein the MM Nd fiber converter is configured with a Nd doped fiber having concentric core and at least one cladding, wherein the core and cladding being configured with respective uniform cross-sections.

8. The HPUBPS of claim 1, wherein the MM Nd fiber converter is configured with a core and at least one cladding surrounding the core, the core and cladding each having a double bottleneck-shaped cross-section.

9. The HPUBPS of claim 1, wherein the MM Nd fiber converter is configured with a core and at least one cladding surrounding the core, the core having a double bottleneck-shaped cross-section and the at least one cladding having a substantially uniformly dimensioned cross-section.

10. The HPUBPS of claim 1, wherein the Nd wavelength fiber converter is configured with a numerical aperture ranging between about 0.05 and about 0.13, whereas a numerical aperture of the MM seed source varies between about 0.1 and about 0.13.

11. The HPUBPS of claim 1 further comprising a wavelength selector located between and coupled to the Nd wavelength fiber converter and to the SM Yb fiber oscillator, the wavelength selector being transparent to the first wavelength of the amplified signal light and preventing light at parasitic wavelengths different from the first wavelength.

12. A high power ultra-bright single mode fiber laser system ("HPUBSMFLS"), comprising:
 a plurality of sub-pump laser diodes emitting a sub-pump light at a first wavelength,
 a multi-mode ("MM") Nd fiber wavelength converter receiving the sub-pump light and operative to emit a pump signal light at a second wavelength longer than the first wavelength, and
 a single mode ("SM") Yb fiber oscillator receiving the amplified pump signal light at the second wavelength and operative to absorb a pump light at the second wavelength and emit a pump light at a third wavelength around 976 nm longer than the second wavelength; and
 a fiber laser device receiving the pump light and configured with peak absorption at about the third wavelength and operative to emit a system light substantially in the SM.

13. The HPUBSMFLS system of claim 12, wherein the fiber laser device includes an active fiber doped with rare-earth ions selected from the group consisting of Yb, Er and a combination thereof.

14. The HPUBSM FLS of claim 12, wherein the fiber laser device includes a fiber amplifier or a fiber oscillator.

15. The HPUBSMFLS of claim 12 wherein the pump source is configured to end pump the fiber laser device or side pump the fiber laser device.

16. The HPUBSMFLS of claim 12, wherein the system light is emitted at a system wavelength amplifier not exceeding 0.1 of the third wavelength.

17. The HPUBSMFLS of claim 12, wherein the fiber laser device is configured with a SM core or a MM core, the MM core being configured to emit the system light in substantially the single mode at a desired wavelength.

18. The HPUBSMFLS of claim 12, wherein the pump source further having a one or more MM seed sources emitting a pump signal light at the second wavelength which varies between 900 and 940 nm, the seed source being selected from laser diodes or fibers.

19. The HPUBSMFLS of claim 12, wherein the sub-pump laser diodes emit the sub-pump light at the first wavelength ranging between about 800 nm to about 810 nm, the sub-pump laser diodes being combined with one another to side pump the wavelength fiber converter or end pump the wavelength fiber converter.

20. The HPUBSMFLS of claim 12, wherein the MM Nd wavelength fiber converter and SM Yb fiber oscillator each are configured with a doped fiber having concentric core and at least one cladding, wherein the core and cladding being configured with respective uniform cross-sections.

21. The HPUBSMFLS of claim 12, wherein the MM Nd wavelength fiber converter and SM Yb fiber oscillator each are configured with a core and at least one cladding surrounding the core, the core and cladding each having a double bottleneck-shaped cross-section.

22. The HPUBSMFLS of claim 12, wherein the MM Nd wavelength fiber converter and SM Yb fiber oscillator each are configured with a core and at least one cladding surrounding the core, the core having a double bottleneck-shaped cross-section and the at least one cladding having a substantially uniformly dimensioned cross-section.

23. The HPUBSMFLS of claim 12, wherein the Nd wavelength fiber converter is configured with a NA ranging between about 0.05 and about 0.13, whereas a numerical aperture of the MM seed source varies between about 0.1 and about 0.13.

24. The HPUBSMFLS of claim 12, wherein the seed source further has a wavelength selector coupled located between and coupled the Nd wavelength fiber converter and the SM fiber oscillator, the wavelength selector being transparent to the second wavelength of the amplified signal light and preventing light at parasitic wavelengths different from the second wavelength.

25. HPUBSMFLS of claim 12, wherein one or more seed sources end pump the fiber laser device or side-pump the fiber laser device.

26. A high power ultra-bright single mode fiber laser system ("HPUBSMFLS"), comprising a pump system configured with a pump seed source, an MM Nd fiber amplifier downstream from the pump seed source, and an Yb SM laser downstream from the MM Nd fiber amplifier, the MM Nd amplifier and SM Yb laser are so configured that the SM Yb laser output at wavelengths around 975 nm is hundred times brighter than and up to ten times more powerful than a MM seed signal at about 920 nm emitted by the MM pump seed source.

27. The HPUBSMFLS of claim 26 further comprising a fiber laser device having an active fiber which is doped with Yb ions or Er ions or Er/Yb ions and having a peak absorption around 9765 nm.

28. The HPUBSMFLS of claim 27, wherein the fiber device includes a fiber laser or a fiber amplifier.

29. The HPUBSMFLS of claim 27, wherein the active fiber of the fiber laser device is configured with a MM core capable of supporting substantially only a fundamental mode.

30. The HPUBSMFLS of claim 26 further comprising a plurality of pump laser diodes emitting a sub-pump light in a 800-810 nm range which is delivered by a delivery fiber into the Nd amplifier, wherein the Nd amplifier has a bottleneck cross-section including spaced end regions, a central region spaced inwards from the end regions and transition regions bridging respective end regions with opposite ends of the central region, respectively, wherein the central region has a uniformly dimensioned cross-section larger than a uniformly dimensioned cross-section of the end regions.

* * * * *